United States Patent [19]

Hosoe et al.

[11] E Re. 30,099

[45] Reissued Sep. 18, 1979

[54] DISTANCE DETECTING DEVICE

[75] Inventors: Kazuya Hosoe, Machida; Seiichi Matsumoto, Tokyo, both of Japan

[73] Assignee: Canon Kabushiki Kaisha, Tokyo, Japan

[21] Appl. No.: 821,152

[22] Filed: Aug. 2, 1977

Related U.S. Patent Documents

Reissue of:

[64] Patent No.: 3,898,676
Issued: Aug. 5, 1975
Appl. No.: 426,523
Filed: Dec. 20, 1973

[30] Foreign Application Priority Data

Dec. 27, 1972 [JP] Japan ..... 48-3922

[51] Int. Cl.[2] ..... G03B 7/08; G03B 3/00; G03B 27/52

[52] U.S. Cl. ..... 354/25; 250/208; 352/140; 353/101; 355/55

[58] Field of Search ..... 354/25, 31; 353/101; 352/140; 355/55; 250/201, 208, 209, 234; 356/126

[56] References Cited

U.S. PATENT DOCUMENTS

| | | | |
|---|---|---|---|
| 3,274,914 | 9/1966 | Biedermann et al. | 354/25 |
| 3,529,528 | 9/1970 | Leitz | 354/25 |
| 3,532,045 | 10/1970 | Genähr | 354/25 |
| 3,713,371 | 1/1973 | Kurihara et al. | 354/31 X |
| 3,904,869 | 9/1975 | Stauffer | 354/25 X |

*Primary Examiner*—Richard A. Wintercorn
*Attorney, Agent, or Firm*—Toren, McGeady and Stanger

[57] ABSTRACT

A distance detecting device utilizable in an optical device such as a camera and the like requiring focusing operation of the optical system thereof. The detecting device enables the adjustment of the relative optical length between the group of light receiving elements arranged adjacent to the image forming plane of the object to be measured by the distance measuring optical system and the distance measuring optical system. The detecting device is characterized in that the output of each of the light receiving elements of the groups is introduced through an electric switching device for effecting the time seriation of the outputs of the respective light receiving elements into a common signal processing circuit, so as to adjust the relative optical length by means of a motor provided in responsive relationship to the output of the signal processing circuit thereby permitting the focusing of the image on the groups of the light receiving elements to be made to the most proper condition.

81 Claims, 15 Drawing Figures

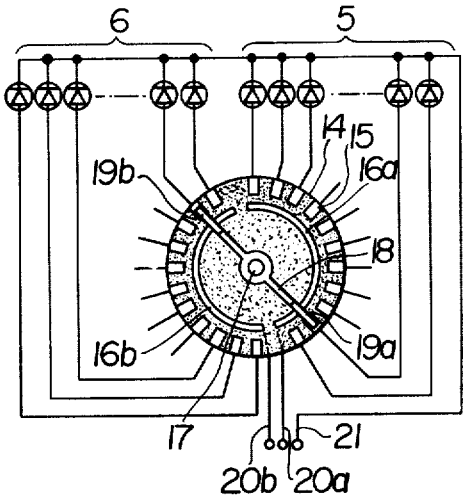
FIG. 3a
FIG. 3b
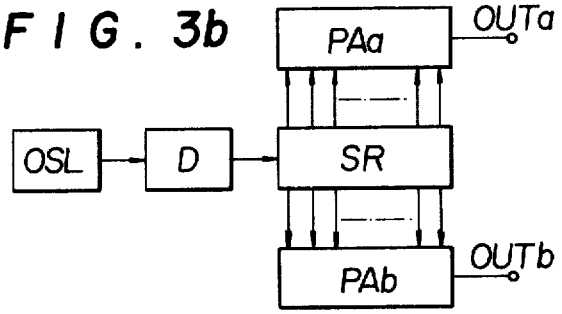
FIG. 3c
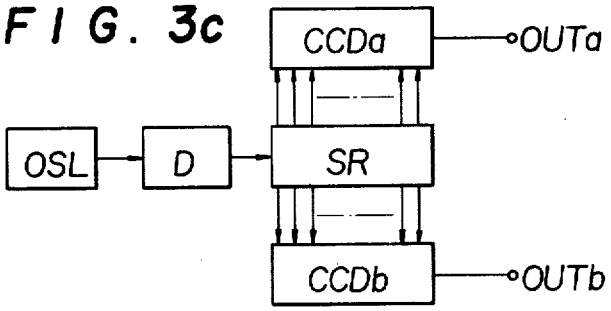

DISTANCE DETECTING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a distance detecting device utilizable in an optical device such as a camera and the like requiring the focusing operation of the optical system thereof, and, more particularly, the present invention aims at rendering the focusing condition of an image obtained by a distance measuring optical system or a photographing optical system arranged is coupled relationship with the distance measuring optical system to be in the most proper condition by measuring photo-electrically the distance of the object to be measured and controlling the distance measuring optical system or the photographing optical system through a focusing degree identifying output means such as a motor into which the measured results are introduced.

2. Description of the Prior Art

Heretofore, a device has been proposed in Japanese Patent Publication No. 6983/1972 and the like for aiming at the most proper condition of focusing of an image formed by the distance measuring optical system for the object to be measured or by the photographing optical system arranged in coupled relationship with the distance measuring optical system by photoelectrically measuring the distance of the object to be measured and by controlling the distance measuring optical system or the photographing optical through a focusing degree identifying output means such as a motor into which the measured result is introduced.

The technique disclosed in the above described Japanese Patent Publication No. 6983/1972 is a device for automatically effecting the focus adjustment required in the optical device in which a pair of fixed lens system and movable lens system each having the equal focal length are located in spaced apart relationship from each other in a plane perpendicular to the optical axis and a slit plate is positioned in a image forming plane common to both the lens systems for passing therethrough a portion of the light which has passed through each of the lens systems a photoelectric transducer element consisting of the respective lens system and a light receiving element is located behind the slit plate, and the outputs of the respective photoelectric transducer elements obtained by vibrating either one of the slit plate and the photoelectric transducer element at a predetermined period are a.c. amplified independently from each other so as to provide rectangular wave forms. Thereafter, the phase difference between these two rectangular wave forms is detected, while one of the above described rectangular wave forms is differentiated by a differentiation circuit, the phase of the output of the electric vibration corresponding to the vibration either of the slit plate or the photoelectric transducer element being detected so as to obtain a gate input to a control circuit for controlling the normal and the reverse rotation of a servomotor. The servomotor is coupled with the movable lens system so as to move the same to a position at which the gate input becomes zero. This movement is utilized for effecting the automatic adjustment of the focusing required for the optical device.

In such a device, however, since the slit plate is located between the fixed lens system and the movable lens system and either one of the photoelectric element or the slit plate is vibrated by the mechanical drive at a predetermined period, disadvantages occur in that noise and vibration inherent to the mechanical device are generated. It is, therefore, impossible to obtain an extreme high speed of the scanning velocity, because the vibrational period of the slit plate or the photoelectric element is solely determined by the above described predetermined period in the mechanical device. Further, since the photoelectric element is formed by a single element, and, since the condition of the image of the object is detected by the slit of a very narrow width in the slit plate arranged between the photoelectric element and the fixed and the movable lens systems, it is made very difficult to effect the succeeding signal processing, because the resistance of the photoelectric element is great and the output signal is small. This causes further difficulty when the object is dark, thereby deteriorating the accuracy in the measurement.

SUMMARY OF THE INVENTION

The primary object of the present invention is to provide a distance detecting device which has a high accuracy in the measurement and in which the detection is effected by the electric scanning process instead of the detection by the scanning process of the mechanical drive thereby preventing noise and vibration inherent to the mechanical device.

The second object of the present invention is to provide a distance detecting device capable of obtaining a high speed of the scanning velocity.

The third object of the present invention is to provide a distance detecting device for obtaining the most proper condition of the focusing of an image by arranging a plurality of light receiving elements adapted to receive light from the object and introducing the outputs of the respective elements constituting the groups of light receiving elements into a common signal processing circuit as timely seriated signals by using electric switching means, thereby obtaining an output corresponding to the imaging condition of the image formed on the groups of light receiving elements or formed by a photographing optical system arranged in coupled relationship to a distance measuring optical system so as to control the distance measuring optical system or the photographing optical system in response to the output corresponding to the imaging condition.

BRIEF DESCRIPTION OF THE DRAWINGS

FIGS. 3(a), (b), (c) are schematic diagrams showing embodiments of the electric switching means suitable for the distance detecting device in accordance with the present invention;

DETAILED DESCRIPTION OF PREFERRED EMBODIMENTS

Figure 1:
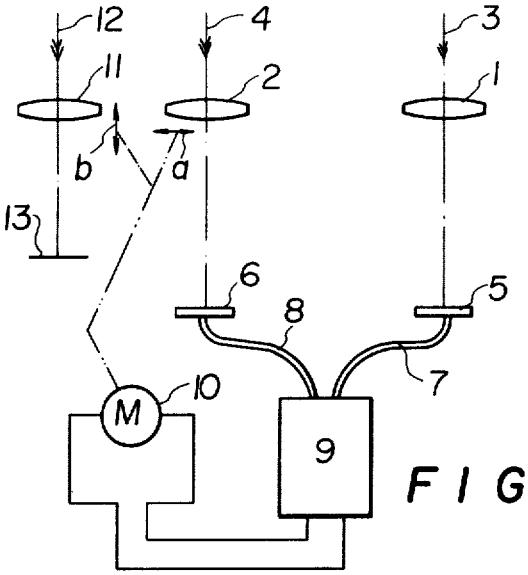
FIG. 1 is a schematic diagram showing an embodiment of the distance detecting device in accordance with the present invention.

In FIG. 1, reference numerals 1, 2 designate objective lenses, respectively, and the light bundles 3, 4 from an object to be measured and passing through the respective objective lenses are focused unto groups 5, 6 of photoelectric elements to form images of the object, respectively. The objective lenses 1 and 2 are located on appropriate distance spaced from each other so as to constitute an optical system of a range finder having a base length for measuring the distance by registering duplicate images of the object in the field of view, the objective lens 2 being movable finely in the direction indicated by the arrow a so as to permit the deviation of focusing of the images formed on the groups 5, 6 of photoelectric elements to be adjusted. The outputs of the groups 5, 6 of photoelectric elements are introduced to lead wire bundles 7, 8, respectively, leading to an electric circuit 9 so that signal processing is effected therein as described later so as to transform the outputs to an output signal corresponding to the deviation of focusing of the image of the object formed by the objective lenses 1, 2 which output signal is supplied to a servomotor 10. The servomotor 10 causes the objective lens 2 to be finely moved for adjustment thereof through a mechanical power transmitting mechanism (not shown) toward the right or left correspondingly to the magnitude and sign of the output signal from the electric circuit 9 until the deviation of focusing of the images of the groups 5, 6 of photoelectric elements is cancelled.

Further, reference numeral 11 shows a photographing lens adapted to be shiftable in the direction indicated by the arrow b, and it passes therethrough the light bundle 12 from the object to be measured so as to focus an image of the object onto the film plane 13. The lens 11 is adapted to be moved in a predetermined correlated relationship with the objective lens 2 by means of the motor 10, thereby remitting the image of the object to be properly focused onto the film plane 13 when the deviation of focusing of the image on the groups 5, 6 of photoelectric element is made zero. Thus, an automatic distance detecting device or an automatic focus adjusting device in a camera, for example, is provided by the construction shown in FIG. 1.

Figure 2A:
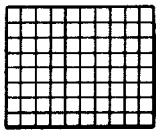
FIG. 2(a) is a diagram showing an exemplary form of the group of photoelectric elements suitable for the distance detecting device in accordance with the present invention, FIGS. 2(b), (c), (d) showing respectively electric connection of the respective elements wherein the photoelectric elements are in the form of photoconductive elements, photodiodes and solar cells, respectively.

FIG. 2(a) shows an exemplary form of the group of photoelectric elements suitable for the present invention. In the example shown, a plurality of photoelectric elements each having very small area are arranged in the same plane. Of course, each of the photoelectric elements is adapted to detect the brightness and darkness of finely divided area of the image of the object to be measured so as to generate an output corresponding to the brightness and darkness of area in which the photoelectric element is located. The configuration each of the photoelectric elements may be in any desired form unless it affects the proper function of the above described detection.

Figure 2B:
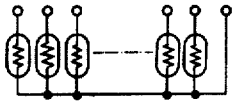
Figure 2C:
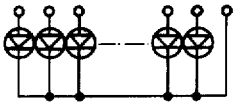
Figure 2D:
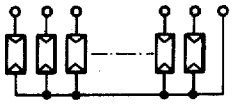

FIGS. 2(b), (c), (d) show, respectively, an electric connection wherein photoconductive elements, photodiodes and solar cells are used as the photoelectric elements, respectively. In these figures, one of the poles each of the photoelectric elements is connected commonly together, while the other pole is held open so as to be adapted to mate with an electric switching circuit to be described later.

FIG. 3(a) shows an example of the construction of electric switching means for the time seriation of the output of each of the photoelectric elements constituting the above described group of photoelectric elements, that is, for scanning the output each of the photoelectric elements. In the figure, numerals 5, 6 designate the groups of photoelectric elements as described in connection with FIG. 1. The construction of or the electric connection each of the photoelectric elements is such as shown in FIG. 2. Numeral 14 designates a base plate made of an electrically non-conductive material, numerals 15, 16 designating electric poles, the electric poles 15 being provided in number corresponding to the number of the photoelectric elements and arranged in the radial direction, respectively. Each of the poles 15 is connected to one of the poles of the respective photoelectric element. The electric pole 16 is in the circular form and is divided into poles 16a, 16b and secured to the base plate 14. A rotatable member 18 fixedly secured to a shaft 17 is constituted at the opposite ends thereof by electrically conductive portions 19a, 19b, and they are adapted to permit the electric pole 15 and the electric pole 16a or the electric pole 15 and the electric pole 16b to be electrically conductive. The electric poles 16a, 16b are provided with lead wires or terminals 20a, 20b. Numeral 21 designates a common terminal of the photoelectric elements. Now, when the shaft 17 is rotated in one direction by appropriate means, the electrically conductive portions 19a, 19b render selected one the electric poles 15 and the electric pole 16 to be electrically conductive by the rotation of the rotatable member 18, thereby permitting the outputs of the elements forming the groups 5, 6 of photoelectric elements to be successively picked up one by one so as to be introduced between the terminal 20a, 20b and 21. In this case, the photoelectric elements supplying the outputs appearing simultaneously at the terminals 20a, 20b will be those in the two groups of photoelectric elements which are positioned correspondingly in the same positions. FIG. 3(b) shows an example for carrying out the above described function by means of an electric circuit. Each of the photoelectric elements constituting the two groups PAa, PAb of photoelectric elements is connected to a shift resistor SR to which an oscillator OSL for generating a signal of appropriate frequency so that the output each of the elements is successively introduced to output OUTa and OUTb by the switching action of the shift resistor SR in the same manner as described previously. In this case, as in the case of FIG. 3(a), the outputs appearing at the outputs OUTa, OUTb simultaneously are those obtained by the photoelectric elements in the two groups PAa, PAb of photoelectric elements which are located correspondingly in the same position, respectively.

FIG. 3(c) shows an example in which CCDs (Charge Coupled Devices) are used in place of the groups of photoelectric elements shown in FIGS. 3(a), (b). The CCDs have been recently developed and are a kind of photoelectric transducer elements which are being brought into practical application. The CCD has a construction by which electric charge proportional to the light input into very small area of the light receiving portion thereof is accumulated in the semiconductor material thereof and the electric charge accumulated in the respective section of the light receiving portion is successively transferred to the output terminal by the action of the transfer gate and the shift resistor, thereby permitting the distribution of brightness of the image formed on the light receiving portion of CCD to be taken out as timely seriated signals.

In the present example, the elements designated by CCDa, CCDb in FIG. 3(c) show the principal portions of CCD including the light receiving portion, the semiconductor portion and the transfer gate. The shift resistor acts on the above described portion so that the timely seriated signals is obtained, and the adaptation of the imaging condition to the most proper condition is achieved by means to be described below by using the timely seriated signals. It is, of course, possible to utilize a photoelectric transducer element such as BBD (Bucket Bridge Device) in the construction in the same manner as in the present example.

Figure 4A:
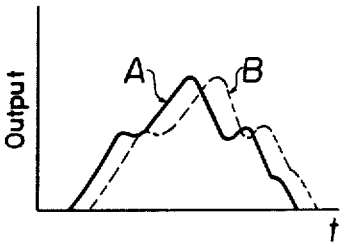
FIGS. 4(a), (b) are diagrams showing as examples the output wave forms obtained from two groups of photoelectric elements in the distance detecting device in accordance with the present invention shown in FIG. 1.
Figure 4B:
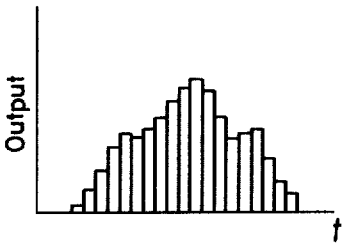

FIG. 4 shows examples of the wave forms of the timely seriated signals of the output each of the photoelectric elements obtained in the manner as described in connection with FIGS. 2 and 3. The ordinate in FIG. 4 shows the magnitude of the output while the abscissa represents the time. FIG. 4(a) shows the case in which each of the photoelectric elements is very small so that the variation in the output signal can be shown as substantially continuous curve. The curves A and B in FIG. 4(a) show the phase difference between the wave forms of the two output signals generated due to the relative shifting of two images in case the above described scanning is carried out with respect to the groups 5, 6 of photoelectric elements shown in FIG. 1. Since the magnitude and the sense of the relative shifting of the two phases correspond to the magnitude and the sense of the relative shifting of the two images, the automatic distance detecting operation can be achieved by means of the circuit to be described below as well as the device of FIG. 1 by utilizing the above described phase difference in the wave forms. The size of the photoelectric elements for the practical use can not be indefinitely divided finely, and, therefore, the wave form of the output signal obtained by the scanning is in the form in which a plurality of pulses of narrow width are combined. In order to facilitate the succeeding signal processing, the output signal is supplied to a sample hold circuit so as to transform the same into a semicontinuous signal the wave form of which is shown in FIG. 4(b). In FIG. 4(b), the wave form of the output signal of only one of the group of photoelectric elements is shown.

Figure 5:
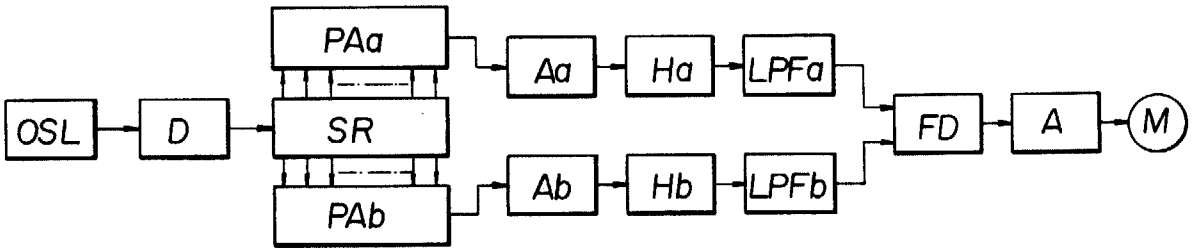
FIG. 5 is a block diagram showing the electric circuit suitable for use in the distance detecting device in accordance with the present invention shown in FIG. 1.

FIG. 5 shows the construction of the electric circuit for enabling the automatic distance detecting function or the automatic focus adjusting function by utilizing the construction or the process shown in FIGS. 1, 2, 3 and 4. In the figure, OSL, D, PAa, PAb and SR are the same in construction and operation as those shown in FIG. 3(b). The outputs from the groups PAa, PAb of photoelectric elements have the wave forms of the signals corresponding to the sense and the magnitude of the relative shifting of the images formed on these groups of photoelectric elements similar to those shown in FIG. 4(a), for example. However, the scanning of the outputs of the photoelectric elements are repeatedly effected at an appropriate time interval, and, therefore, the wave forms of signals as described above are, in effect, repeatedly generated.

These outputs are amplified by amplifiers, Aa, Ab and introduced to sample hold circuits Ha, Hb as their inputs. The outputs of the sample hold circuits are signals in the wave forms as shown in FIG. 4(b), and, in order to eliminate the step-like fine variation included in these signals, the signals are passed through low frequency filters LPFa, LPFb so as to modify the wave forms to relatively smooth wave forms, these two modified signals being fed to a phase discriminator FD as its inputs. The inputs to the phase discriminator FD are two signals which have phase difference corresponding to the magnitude and the sense of the relative shifting of the two images of the object formed on the two groups 5, 6 of photoelectric elements as described previously, therefore, the outputs is made a d.c. signal having signs and magnitudes corresponding to the phase difference referred to above. The output is amplified by an amplifier A so as to be supplied to a servomotor M.

By the signal processing described above, wherein the two sets of timely seriated signals of the respective photoelectric elements obtained by electrically scanning the two groups of photoelectric elements are amplified and held by sample hold circuits and modified in their wave forms, and, thereafter, the phases of the two signals having the phase difference corresponding to the relative shifting or the two images on the two groups of photoelectric elements are compared with each other so as to obtain a d.c. output corresponding to the magnitude and the sense of the phase difference, the obtained d.c. output being further amplified to drive the servomotor by the amplified output, it is possible to make the relative shifting of the two images formed on the two groups of photoelectric elements to be zero by the fine movement of the objective lens 2 effected by the rotation of the servomotor, thereby permitting the automatic distance detection to be carried out. The distance of the object thus measured can be easily read out by providing a distance scale coupled with the fine movement of the objective lens 2 of FIG. 1, for example, although not shown, and it is also possible to focus the image of the object correctly at all times onto the film plane by a photographing optical system coupled with the objective lens 2, thereby permitting the automatic focus adjustment to be carried out.

Figure 6:
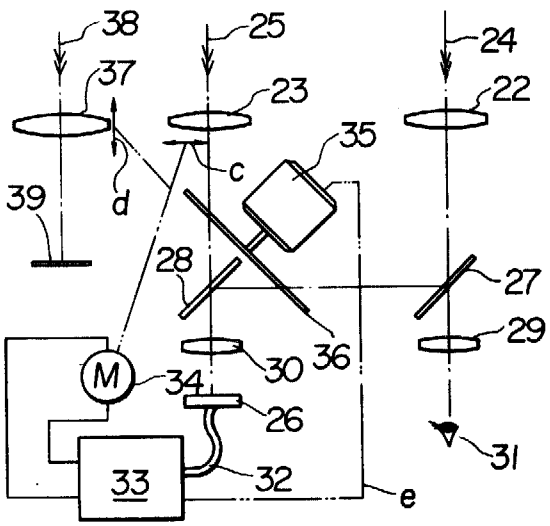
FIG. 6 is a diagram showing an embodiment of the present invention wherein one set of the group of photoelectric elements is used.

FIG. 6 shows an example for carrying out the present invention. Numerals 22, 23 are objective lenses arranged in spaced relationship from each other, the objective lenses being adapted to receive the light bundles 24, 25 from the object to be measured so as to form images thereof, respectively. One 23 of the objective lenses is finely movable in the direction as indicated by the arrow C, thereby causing or compensating for the relative shifting between the image formed by the objective lens 22 and that formed by the objective lens 23.

Figure 7:
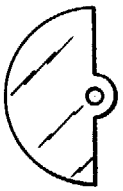
FIG. 7 is a diagram showing an exemplary form of the mechanical chopper suitable for the device shown in FIG. 6.

The light bundle 24 passing through the objective lens 22 is reflected partially by a semi-transparent mirror 27 and the reflected light is again reflected by another semi-transparent mirror 28 and illuminates the group 26 of photoelectric elements 26 through a second image forming lens 30 so as to form an image of the object. On the other hand, the light bundle passing through the semitransparent mirror 27 forms an image of the object through a second lens 29 in the same manner as described above, which image can be observed by an eye 31 in the conventional manner. The light bundle 25 passing through the objective lens 23 passes through the semi-transparent mirror 28 and illuminates the group 26 of photoelectric elements through the second image forming lens 30 so as to form an image of the object. In the light path, a chopper 36 having the form as shown in FIG. 7, for example, is rotatably provided which is so constructed that it allows the light bundles passing through the objective lens 22 and the objective lens 23 to be alternately passed therethrough. The chopper 36 is rotated at an appropriate speed by a motor 35 so that the light bundles passing through the objective lens 22 and the objective lens 23, respectively, are alternately incident to the group 26 of photoelectric elements, i.e., the images of the object formed by the respective light bundles are alternately formed on the group 26. The output signals generated by the group 26 of photoelectric elements are lead to the electric circuit 33 through lead wire bundle 32 so as to be subjected to signal processing as described below so that they are converted into an output signal corresponding to the relative shifting of the images of the object formed by the objective lenses 22, 23, respectively, so as to be supplied to the servomotor 34. The servomotor 34 causes the objective lens 23 to be finely moved through a mechanical power transmitting mechanism (not shown) toward the right or left in response to the magnitude and the sign of the output from the electric circuit 33 until the relative shifting of the images alternately formed on the group 26 of photoelectric elements becomes zero, thereby achieving the adjustment of the objective lens.

Numeral 37 designates photographing optical system adapted to be moved in the direction of the arrow d, the photographing optical system 37 permitting the light bundle 38 from the object to be passed therethrough so as to form an image of the object onto the film plane 39. The image formed by the photographing optical system 37 can be correctly focused unto the film plane 39 when the relative shifting of the two images formed alaternately on the group 26 of photoelectric elements is made zero by moving the objective lens 23 in the predetermined correlated relationship with the photographing optical system by means of the motor 34, thus permitting the automatic distance detecting device or the automatic focus adjusting device to be provided. In the present embodiment, since only one group of photoelectric elements is used, it has a remarkable characteristic feature that deterioration of accuracy in the distance detection due to errors liable to occur in mounting two groups of photoelectric elements, if such are used, and variation in properties of the photoelectric elements is eliminated.

Figure 8:
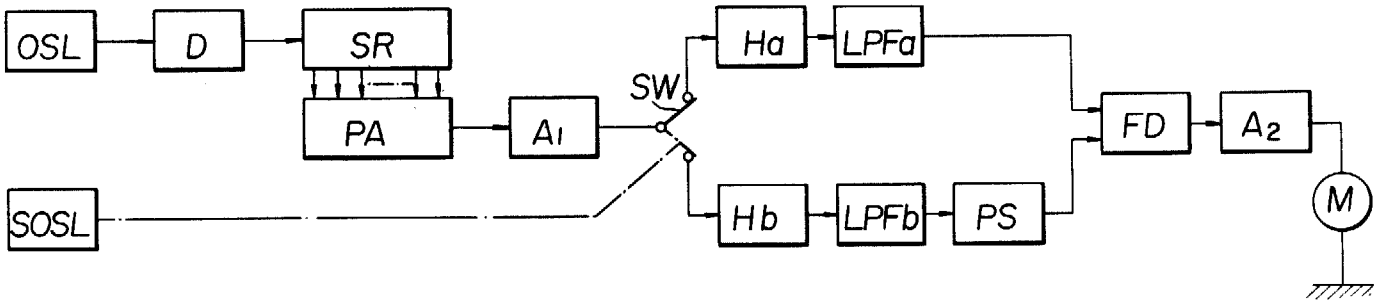
FIG. 8 is a block diagram of the electric circuit suitable for use in the device shown in FIG. 6.

FIG. 8 is a block diagram showing an electric circuit suitable for use in the device shown in FIG. 6. In the figure, the oscillator OSL, the driver D, the shift resistor SR and the group PA of photoelectric elements are the same in construction and function with those shown in FIG. 5. The output obtained from the group PA of photoelectric elements is amplified by an a.c. amplifier $A_1$.

The change-over switch SW has a function to switch the output signal of the a.c. amplifier $A_1$ so as to supply alternately to either of the left and right circuits in the figure to be described later by means of the signal from the synchronizing signal generator SOSL. The synchronizing signal generator SOSL generates a pulse at the time in which the shift resistor commences the scanning of the image of the object formed by the light bundle which is not intercepted by the chopper 36 in FIG. 6, so that the switch SW is switched by the pulse. The scanning of the shift resistor is effected during the time in which the chopper 36 allows one of the two light bundles to be passed therethrough, and, when the other of the light bundles is passed through the chopper, the scanning of the shift resistor is commenced anew, during which time the switch SW is switched so that the signal obtained by the group PA of photoelectric elements is lead to another circuit other than that to which the signal obtained immediately before the switching operation is lead. Further, the motor 35 for rotating the chopper is provided with a contact for generating a pulse when the light bundle is switched, and the thus generated pulse is lead to the electric circuit 33 as shown by the broken line e in FIG. 6 so that it triggers the oscillator OLS and the synchronizing signal generator SOSL provided in the electric circuit. As is clear from the above description, the sample hold circuits Ha, Hb in FIG. 8 are supplied with the timely seriated signals of the images formed by objective lenses 22, 23 independently from each other.

The outputs from the sample hold circuits are respectively fed to the low frequency filters LPFa and LPFb so that the high frequency components are eliminated. The phase relationship between the outputs from the low frequency filters LPFa and LPFb are opposite to each other, because the group 26 of photoelectric elements is alternately scanned, and, in order to compensate therefor, the output of the low frequency filter LPFb is lead to a phase shifter PS. Therefore, the output signals from the phase shifter PS and the low frequency filter LPFa are made to have no phase difference when there is no relative shifting of the two images formed by the two light bundles.

The two signals as described above are then applied to the input of a phase discriminator FD so that a d.c. output is generated which corresponds to the magnitude and the sense of the phase difference based on the relative shifting of the two images on which the signals are based. The d.c. output is amplified by a d.c. amplifier so as to drive thereby the servomotor $M_1$. By the fine movement of the objective lens 23 caused by the rotation of the servomotor as described above, the operation as described in connection with FIG. 1 is achieved thereby permitting the automatic distance detection or the automatic focus adjustment to be carried out.

Figure 9:
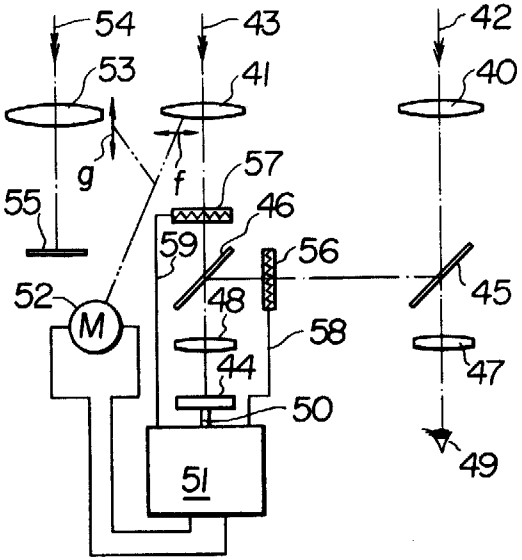
FIG. 9 is a diagram showing another embodiment wherein one set of the group of photoelectric elements is used.

FIG. 9 shows an example modified from the embodiment of the present invention shown in FIGS. 6, 7 and 8 in that two liquid crystals are inserted into the light paths in place of the chopper for switching the transmission of the light bundles, the two liquid crystals being subjected alternately to electric field so as to selectively form the diffusing surface, thereby obtaining the switching of the transmission of the light bundles. In the figure, numerals 40, 41 are the objective lenses, numerals 42, 43 designating the light bundles from the object passing respectively through the objective lenses. Numeral 44 designates the group of photoelectric elements, 45, 46 designating the semitransparent mirrors, 47, 48 designating respectively second image forming lenses, 49 the eye of the person carrying out the measurement, 50 designating lead wire bundle adapted to lead the output from the group 44 of photoelectric elements, 51 the electric circuit, 52 the servomotor, 53 the photographing optical system, 54 the light bundle from the object, 55 the film. The detailed construction and the function of these elements are the same as those shown in FIG. 6.

In the present instance, in addition to the above described elements, transparent glass plates 56, 57 enclosing therein the liquid crystals, respectively, are provided in the light paths to which the light bundles 42, 43 are introduced, respectively. The liquid crystals in the glass plates 56, 57 are connected to the lead wires 58, 59 leading to a suitable electric source in the electric circuit 51 so that the liquid crystals are alternately subject to electric field by the electric source through the lead wires. When the electric field is applied to the liquid crystal, the liquid crystal which had been transparent is transformed to the condition having an optical diffusing property, thereby making the glass plate to a diffusing plate. Thus, the glass plates are alternately rendered to be diffusing surfaces, thereby causing the diffusion of either of the light bundles corresponding to the diffused glass plate so that image formation is disabled by the light bundle passing through the diffused glass plate. This causes the image of the object to be formed alternately on the group 44 of photoelectric elements by either of the light bundles 42, 43. This results in the same effect as obtained by the chopper in FIG. 6.

The electric circuit to be used in the device shown in this figure is substantially the same as the example in FIG. 8 except that the switching action of the switch SW by means of synchronizing signal generator SOSL in the example of FIG. 8 is effected in synchronism with the application of electric field to either of the glass plates in which liquid crystal are enclosed, respectively.

What is claimed is:

1. A distance detecting device, comprising:

a distance measuring optical system for forming an image of an object to be measured;

photoelectric transducer means arranged adjacent to the image forming plane of said distance measuring optical system, for developing electrical signals in response to incident light said transducer means including a plurality of photoelectric transducer elements arranged in juxtaposed relationship to each other;

time seriating means for time seriating the outputs of the respective elements constituting said photoelectric transducer means so as to form time seriated signals;

means for producing a time varying reference signal proportional to the distance to said object;

signal processing means for receiving said time seriated signals and said reference signal and for comparing the time seriated signal and reference signal to generate an output signal corresponding to the condition of focusing of said image of said object; and focusing degree identifying output means, said means for receiving the output signal from said signal processing circuit for adjusting the relative length of the light path between said distance measuring optical system and said photoelectric transducer means, thereby compensating for the detected condition of the focusing of the image of said object on said photoelectric transducer means formed by said distance measuring optical system so as to detect the distance of said object.

2. A device according to claim 1, wherein said time seriating means comprises electric switching means for coupling the output of the respective elements sucessively to said signal processing means.

3. A device according to claim 1, wherein said focusing degree identifying output means is a motor.

4. A distance detecting device, comprising:

a distance detecting optical system for forming an image of an object to be measured;

photoelectric transducer means arranged adjacent to the image forming plane of said distance detecting optical system, for develping electrical signals in response to incident light, said means including a plurality of photoelectric transducer elements each capable of accumulating electric charge corresponding to the quantity of light incident thereto and arranged in juxtaposed relationship to each other;

time seriating means for picking up the electric charged accumulated in said photoelectric transducer means for generating time seriated signals;

means for producing a time varying reference signal proportional to the distance to said object;

signal processing means for receiving said time seriated signals and said reference signal and for comparing the time seriated signal and reference signal to generate an output signal corresponding to the condition of focusing of the image of said object; and focusing degree identifying output means, said means for receiving the output signal from said signal processing means for adjusting the relative length of the optical path between said distance measuring optical system and said photoelectric transducer means, thereby compensating for the detected condition of the focusing of the image of the object on said photoelectric transducer means formed by said distance measuring optical system so as to detect the distance of the object.

5. A device according to claim 4, wherein said time seriating means is provided with electric switching means for coupling the output of the respective element successively to said signal processing means.

6. A device according to claim 4, wherein said focusing degree identifying output means is a motor.

7. A device according to claim 4, wherein said photoelectric transducer means is a charge coupled device.

8. A device according to claim 4, wherein said photoelectric transducer means is a bucket brigade device.

9. A distance detecting device having a fixed optical system and a movable optical system, said systems having equal focal length and located in spaced relationship from each other in a plane perpendicular to the optical axis and photoelectric transducer means arranged adjacent to a common image forming plane of both of said optical systems so as to photoelectrically measure the distance of an object to be measured, said device comprising:

said photoelectric transducer means including a first group of a plurality of photoelectric transducer elements arranged in juxtaposed relationship to each other and aligned with said fixed optical system and a second group of a plurality of photoelectric transducer elements arranged in the same configuration as those of said first group and aligned with said movable optical system;

time seriating means for scanning the elements in said first and second groups so as to time seriate the output signals of said elements to generate the respective time seriated signals; and a control circuit, said control circuiting including:

a. phase discriminating means for detecting the phase difference in said two series of time seriated signals so as to generate an output signal corresponding to the detected phase difference; and b. focusing degree identifying output means adapted to receive the output signal from said phase discriminating means for adjusting the relative length of the optical path between said movable optical system and said second group of photoelectric transducer elements, thereby permitting the condition of focusing of the image of the object on said second group of photoelectric elements formed by said movable optical system to be adjusted to an optimum condition.

10. A device according to claim 9, wherein said time seriating means is provided with electric switching means for coupling the output of the respective elements successively to said control circuit.

11. A device according to claim 9, wherein said focusing degree indentifying means is a motor.

12. A device according to claim 9, further comprising a photographing optical system arranged to be actuated in responsive relationship to the output of said focusing degree identifying output means.

13. A distance detecting device having a fixed optical system and a movable optical system said systems having equal focal length and located in spaced relationship from each other in a plane perpendicular to the optical axis and photoelectric transducer means arranged adjacent to a common image forming plane of both of said optical systems so as to photoelectrically measure the distance of an object to be measured, said device comprising:

said photoelectric transducer means being comprised of a plurality of elements arranged in juxtaposed relationship to each other;

optical means for focusing images of the object formed by the image bearing light bundles passing through said fixed and movable optical systems, respectively, onto said photoelectric transducer means;

shutter means interposed between said fixed and movable optical systems and said photoelectric transducer means, said means allowing the image-bearing light bundles passing through said fixed optical system and said movable optical system, respectively, to be alternately incident to said photoelectric transducer means;

time seriating means, said means being adapted to scan the respective elements in said group of photoelectric elements so as to convert the output signals obtained by said fixed and movable optical systems into separate two series of time seriated signals; and a control circuit, said circuit including:

a. phase discriminating means for detecting the phase difference between said separate two series of time seriated signals so as to generate an output signal corresponding to the detected phase difference, and b. focusing degree identifying output means adapted to receive the output from said phase discriminating means for adjusting the relative length of the light path between said movable optical system and said photoelectric transducer means, thereby permitting the condition of focusing of the image of the object formed by said movable optical system to be adjusted to an optimum condition.

14. A device according to claim 13, wherein said time seriating means is provided with electric switching means for coupling the output of the respective photoelectric elements successively to said control circuit.

15. A device according to claim 13, wherein said focusing degree identifying output means is a motor.

16. A device according to claim 13, further comprising a photographing optical system arranged to be operated in responsive relationship to said focusing degree identifying output means.

*17. A distance detecting device for detecting the distance between the device and an object, comprising:*

*(A) a range finding optical system arranged so as to form two images of said object with relative positional parallax corresponding to the distance to the object;*

*(B) photoelectrical light receiving means arranged so as to receive said two images formed by the optical system and to provide output signals representative of the relative position of one of the two images with respect to the position of the other image, said light receiving means including a plurality of photosensitive elements each of which provides an electrical signal corresponding to light incident thereon;*

*(C) time seriating means electrically coupled to said light receiving means for time seriating the electrical signals of the respective photosensitive elements;*

*said light receiving means providing time seriated signals as the output signals thereof through the operation of the time seriating means; and*

*(D) signal processing means receiving said time seriated output signals of the light receiving means to provide an electrical output representative of the distance between the device and the object.*

*18. A device according to claim 17, wherein said range finding optical system comprises;*

*(a) sighting optical means adapted to be aligned to said object so as to form a 1st image of the object at a predetermined position; and*

*(b) detecting optical means arranged so as to form a 2nd image of the object at a position corresponding to the distance to the object; and*

*wherein said light receiving means is arranged so as to receive said 1st and 2nd images and to provide output signals representative of the relative position of the 2nd image formed by the detecting optical means with respect to the position of said 1st image formed by the sighting optical means.*

*19. A device according to claim 18, wherein said photoelectrical light receiving means includes a 1st group of the photosensitive elements adapted to receive said 1st image formed by the sighting optical means and a 2nd group of the photosensitive elements adapted to receive said 2nd image formed by the detecting optical means.*

*20. A device according to claim 19, wherein said signal processing means provides said electrical output by comparing the time seriated output signal of the 2nd group of the elements with the time seriated output signal of the 1st group of the elements.*

*21. A device according to claim 20, wherein said time seriating means simultaneously time seriates the electrical*

*signals of the respective elements in said 1st group and the electrical signals of the respective elements in said 2nd group.*

*22. A device according to claim 21, wherein said time seriating means includes at least an oscillator and a driver circuit which is electrically coupled to the oscillator and said photoelectrical light receiving means for simultaneously driving said 1st and 2nd groups of the elements in a time serial manner.*

*23. A device according to claim 21, wherein said photoelectrical light receiving means comprises a 1st and a 2nd photodiode arrays each having a plurality of photodiodes, in correspondence to said 1st and 2nd groups of the elements;*

*and wherein said time seriating means is electrically coupled to each of said 1st and 2nd photodiode array so as to simultaneously time seriate the electrical signals of the respective photodiodes in the 1st array and the electrical signals of the respective photodiodes in the 2nd array.*

*24. A device according to claim 21, wherein said photoelectrical light receiving means comprises a 1st and a 2nd CCDs (Charge Coupled Devices) each having a plurality of electrical charge storing photosensors, in correspondence to said 1st and 2nd groups of the elements;*

*and wherein said time seriating means is electrically coupled to each of said 1st and 2nd CCDs so as to simultaneously time seriate the electrical charges of the respective photosensors in the 1st CCD and the electrical charges of the respective photosensors in the 2nd CCD.*

*25. A device according to claim 21, wherein said photoelectrical light receiving means comprises a list and a 2nd BBDs (Bucket Brigade Devices) each having a plurality of electrical charge storing photosensors, in correspondence to said 1st and 2nd groups of the elements;*

*and wherein said time seriating means is electrically coupled to each of said 1st and 2nd BBDs so as to simultaneously time seriate the electrical charges of the respective photosensors in the 1st BBD and the electrical charges of the respective photosensors in the 2nd BBD.*

*26. A device according to claim 18, wherein said sighting optical means is adapted as viewing means for viewing said object.*

*27. A device according to claim 17, wherein said photoelectrical light receiving means is a photodiode array having a plurality of photodiodes each providing an electrical signal corresponding to light incident thereon and arranged in juxtaposed relationship to each other;*

*and wherein said time seriating means is electrically coupled to the array and time seriates the electrical signals of the respective photodiodes.*

*28. A device according to claim 17, wherein said photoelectrical light receiving means is a CCD (Charge Coupled Device) having a plurality of electrical charge storing photosensors each storing an electrical charge corresponding to light incident thereon and arranged in juxtaposed relationship to each other;*

*and wherein said time seriating means is electrically coupled to the CCD and time seriates the electrical charges of the respective photosensors.*

*29. A device according to claim 17, wherein said photoelectrical light receiving means is a BBD (Bucket Brigade Device) having a plurality of electrical charge storing photosensors each storing an electrical charge corresponding to light incident thereon and arranged in juxtaposed relationship to each other;*

*and wherein said time seriating means is electrically coupled to the BBD and time seriates the electrical charges of the respective photosensors.*

*30. A device according to claim 17, wherein said time seriating means includes at least an oscillator and a driver circuit which is electrically coupled to the oscillator and said photoelectrical light receiving means so as to electrically driving the light receiving means.*

*31. A distance measuring device for measuring the distance between the device and an object, comprising;*

*(A) a range finding optical system arranged so as to form two images of said object with relative positional parallax corresponding to the distance to the object, said optical system having at least one movable optical member for varying said relative positional parallax between the two images, and said movable optical member having a plurality of different positions each representing a different object distance;*

*(B) photoelectrical light receiving means arranged so as to receive said two images and to provide a 1st output signal representative of the position of one of the two images and a 2nd output signal representative of the position of the other image, said light receiving means including a plurality of photo-sensitive elements each providing an electrical signal corresponding to light incident thereon;*

*(C) time seriating means electrically coupled to said light receiving means for time seriating the electrical signals of the respective photosensitive elements;*

*said light receiving means providing a 1st and a 2nd time seriated signals as said 1st and 2nd output signals thereof through the operation of said time seriating means; and*

*(D) signal processing means receiving said 1st and 2nd time seriated output signals of the light receiving means to provide an electrical output representative of the relative position of one of said two images with respect to the position of the other image;*

*thereby the distance between the device and the object is indicated by the set position of the movable optical member in the optical system when the relative positions of the two images coincide with each other.*

*32. A device according to claim 31, wherein said range finding optical system comprises;*

*(a) sighting optical means adapted to be aligned to the object so as to form a 1st image of the object at a predetermined position; and*

*(b) detecting optical means arranged so as to form a 2nd image of the object at a position corresponding to the distance to the object, said detecting optical means including said movable optical member for varying the relative position of the 2nd image with respect to the position of the 1st image;*

*and wherein said photoelectrical light receiving means is arranged so as to receive said 1st and 2nd images and to provide said 1st output signal in response to the position of the 1st image and said 2nd output signal in response to the position of the 2nd image.*

*33. A device according to claim 32, wherein said photoelectrical light receiving means includes a 1st group of the photosensitive elements adapted to receive said 1st image formed by the sighting optical means and to provide said 1st output signal, and a 2nd group of the photosensitive elements adapted to receive said 2nd image formed by the detecting optical means and to provide said 2nd output signal.*

*34. A device according to claim 33, wherein said signal processing means provides said electrical output by com-*

*paring the time seriated output signal of the 2nd group of the elements with the time seriated output signal of the 1st group of the elements.*

*35. A device according to claim 34, wherein said time seriating means simultaneously time seriates the electrical signals of the respective elements in said 1st group and the electrical signals of the respective elements in said 2nd group.*

*36. A device according to claim 35, wherein said photoelectrical light receiving means comprises a 1st and a 2nd photodiode arrays each having a plurality of photodiodes, in correspondence to said 1st and 2nd groups of the elements;*

*and wherein said time seriating means is electrically coupled to each of said 1st and 2nd photodiode array so as to simultaneously time seriate the electrical signals of the respective photodiodes in the 1st array and the electrical signals of the respective photodiodes in the 2nd array.*

*37. A device according to claim 31, wherein said photoelectrical light receiving means comprises a 1st and a 2nd CCDs (Charge Coupled Devices) each having a plurality of electrical charge storing photosensors, in correspondence to said 1st and 2nd groups of the elements;*

*and wherein said time seriating means is electrically coupled to each of said 1st and 2nd CCDs so as to simultaneously time seriate the electrical charges of the respective photosensors in the 1st CCD and the electrical charges of the respective photosensors in the 2nd CCD.*

*38. A device according to claim 32, wherein said sighting optical means is adapted as viewing means for viewing said object.*

*39. A device according to claim 31, wherein said photoelectrical light receiving means is a photodiode array having a plurality of photodiodes each providing an electrical signal corresponding to light incident thereon and arranged in juxtaposed relationship to each other;*

*and wherein said time seriating means is electrically coupled to the array and time seriates the electrical signals of the respective photodiodes.*

*40. A device according to claim 31, wherein said photoelectrical light receiving means is a CCD (Charge Coupled Device) having a plurality of electrical charge storing photosensors each storing an electrical charge corresponding to light incident thereon and arranged in juxtaposed relationship to each other;*

*and wherein said time seriating means is electrically coupled to the CCD and time seriates the electrical charges of the respective photosensors.*

*41. A device according to claim 31, wherein said time seriating means includes at least an oscillator and a driver circuit which is electrically coupled to the oscillator and said photoelectrical light receiving means so as to electrically driving the light receiving means.*

*42. A device according to claim 31, further comprising;*

*adjusting means for adjusting the position of said movable optical member in the optical system in response to the electrical output of said signal processing means;*

*said signal processing means stopping the adjusting operation of said adjusting means when relative positions of said two images coincide with each other in the adjusting process of said movable optical member.*

*43. A focus detecting device for detecting the focusing condition of an image forming lens system to an object, said lens system having an optical axis and adjustable along the axis, said device comprising;*

*(A) a range finding optical system operatively associated with said image forming lens system so as to form two images of said object with relative positional parallax corresponding to the deviation of set position of the lens system from a position at which the lens system is properly focused on the object;*

*(B) photoelectrical light receiving means arranged so as to receive said two images and to provide a 1st output signal representative of the position of one of the two images and a 2nd output signal representative of the position of the other image, said light receiving means including a plurality of photosensitive elements each providing an electrical signal corresponding to light incident thereon;*

*(C) time seriating means electrically coupled to said light receiving means for time seriating the electrical signals of the respective photosensitive elements;*

*said light receiving means providing a 1st and a 2nd time seriated signals at said 1st and 2nd output signals thereof through the operation of said time seriating means; and*

*(D) signal processing means receiving said 1st and 2nd time seriated output signals of the light receiving means to provide an electrical output representative the deviation of the set position of said image forming lens system to the position at which the lens system is properly focused on the object.*

*44. A device according to claim 43, wherein said range finding optical system comprises;*

*(a) sighting optical means adapted to be aligned to the object so as to form a 1st image of the object at a predetermined position; and*

*(b) detecting optical means arranged so as to form a 2nd image of the object at a position corresponding to the distance to the object, said detecting optical means having at least one movable optical member operatively connected to said image forming lens system for arraying the relative position of the 2nd image with respect to the position of the 1st image in correspondence to the set position of the lens system along the optical axis;*

*and wherein said photoelectrical light receiving means is arranged so as to receive said 1st and 2nd images and to provide said 1st output signal in response to the position of the 1st image and said 2nd output signal in response to the position of the 2nd image.*

*45. A device according to claim 44, further comprising;*

*adjusting means for adjusting the position of said image forming lens system in response to the electrical output of said signal processing means;*

*said signal processing means stopping the adjusting operation of said adjusting means when relative position of said 2nd image coincides with the position of said 1st image in the adjusting process of the lens system.*

*46. A distance detecting device for detecting the distance between the device and an object, comprising:*

*(a) an optical system arranged to form two images of the object, said images having a relative positional difference which varies at least with the change in the distance between the object and the device;*

*(b) photoelectrical light receiving means responsive to said two images, said receiving means including a plurality of photosensitive elements, each for providing an electrical signal corresponding to light incident thereon, said elements being arranged to provide output signals corresponding to the received patterns of said images;*

*(c) time seriating means coupled to said light receiving means for generating two composite output signals corresponding to each image respectively; and*

*(d) signal processing means responsive to said composite output signals for providing an electrical output signal representative of the relative positional difference between said two images on said receiving means.*

*47. A distance detecting device for detecting the distance between the device and an object, comprising:*

*(a) an optical system arranged to form two images of the object, said images having relative positional difference which varies at least with the change in the distance between the object and the device;*

*(b) a first array of photoelectrical light sensitive elements, said first array being arranged so that one of said images is incident thereon, each of said elements for developing an electrical output signal corresponding to the intensity of light associated with a corresponding region of said one image;*

*(c) a second array of photoelectrical light sensitive elements, said second array being arranged so that the other of said images is incident thereon, each of said elements for developing an electrical output signal corresponding to the intensity of light associated with a corresponding region of said other image;*

*(d) time seriating means coupled to said first and second arrays of the sensitive elements for generating two composite output signals corresponding to each image respectively; and*

*(e) comprising means for making a comparison of the composite output signal of said first array with the composite output signal of said second array, for providing an electrical output signal representative of the relative positional difference between said two images on said first and second arrays.*

*48. In a device, comprising:*

*sensing means including a plurality of sensing elements, each providing an electrical signal corresponding to radiation energy incident thereon, said sensing means being arranged to receive two images of an object along different paths, each image having an associated radiation energy intensity distribution, and to provide electrical outputs corresponding to the radiation energy intensity distributions of said two images focused thereon; and circuit means responsive to said electrical outputs of said sensing means to provide an output signal representative of the relative positional difference between said two images on said sensing means;*

*the improvement further comprising:*

*time seriating output means for causing said sensing means to provide as the outputs thereof the electrical signals of the respective sensing elements in a time-seriated manner.*

*49. A distance detecting device for detecting the distance to an object, comprising:*

*(a) sensing means including a plurality of addressable sensing elements, each providing an electrical signal in response to light incident thereon, said sensing means being arranged to receive first and second images of said object along different paths;*

*(b) address means cooperating with said sensing means to scan said first and second images focused on the sensing means, said address means addressing, in a time-seriated manner, the respective sensing elements in the sensing means to cause the sensing means to provide as outputs thereof time seriated electrical signals of the respective sensing elements;*

*said sensing means providing a first time seriated scanning output on said first image and a second time seriated scanning output on said second image through the scanning operation of said address means; and*

*(c) circuit means responsive to said first and second time seriated scanning outputs of said sensing means to provide an output signal representative of the relative positional difference between said first and second images on said sensing means.*

*50. A distance detecting device for detecting the distance to an object, comprising:*

*(a) sensing means including a plurality of sensing elements, each providing an electrical signal corresponding to light incident thereon, said sensing means being arranged to receive first and second images of said object along different paths;*

*(b) time seriating output means cooperating with said sensing means to scan said first and second images focused on the sensing means, said time seriating output means providing the sensing means with time seriating timing signals for causing the sensing means to provide as outputs thereof the time seriated electrical signals of the respective sensing elements;*

*said sensing means providing a first time seriated scanning output on said first image and a second time seriated scanning output on said second image in response to said time seriating timing signals provided by said time seriating output means; and*

*(c) circuit means receiving said first and second time seriated scanning outputs of said sensing means and comparing the first scanning output with the second scanning output to provide an electrical output representative of the relative positional difference between said first and second images on said sensing means.*

*51. An image comparator, comprising:*

*(a) radiation sensing means including a plurality of sensing elements, each providing an electrical signal which varies with the intensity of radiation energy impinging upon a radiation receiving surface thereof;*

*(b) radiation directing means to direct radiations from first and second fields of view to said sensing means;*

*(c) time seriating output means for causing said sensing means to provide as outputs thereof time seriated electrical signals of the respective sensing elements;*

*said sensing means providing a first time seriated electrical output related to said first field of view and a second time seriated electrical output related to said second field of view through the time seriating operation of said time seriating output means;*

*(d) processing circuit means receiving said first and second time seriated electrical outputs of said light sensing means and providing a resultant signal which has a characteristic when the radiations from the first and second fields of view attain a predetermined relationship on said light sensing means; and*

*(e) means connected to receive said resultant signal and operable to change at least one of the fields of view until the resultant signal is proximate the characteristics.*

*52. A distance detecting device for detecting the distance to an object, comprising:*

*(a) photoelectrical sensing means having a plurality of sensing elements, each providing an electrical signal in response to light impinging thereon, said sensing means being arranged to receive first and second images of said object along different paths;*

*(b) path change-over means for causing said sensing means to receive said first and second images selectively along the respective paths;*

*(c) time seriating output means for causing said sensing means to provide as outputs thereof time seriated electrical signals of the respective sensing elements;*

*said sensing means selectively providing a first time seriated scanning output on the first image and a second time seriated scanning output on the second image through the change-over operation of said change-over means and the time seriating operation of said time seriating output means; and*

*(d) circuit means receiving said first and second time seriated scanning outputs of said sensing means and providing an output signal representative of the relative positional difference between said first and second images on said sensing means.*

*53. A distance detecting device for detecting the distance to an object, comprising:*

*(a) light sensing means having a plurality of sensing elements, each providing an electrical signal in response to light incident thereon, and light sensing means being arranged to receive first and second images of said object along different paths;*

*(b) path change-over means for causing said light sensing means to receive said first and second images selectively along the respective paths;*

*(c) time seriating output means for causing said light sensing means to provide as outputs thereof the time seriated electrical signals of the respective sensing elements;*

*said light sensing means selectively providing a first time seriated scanning output on the first image and a second time seriated scanning output on the second image through the change-over operation of said change-over means and the time seriating operation of said time seriating output means;*

*(d) first circuit means for receiving said first time seriated scanning output of said light sensing means;*

*(e) second circuit means for receiving said second time seriated scanning output of said light sensing means;*

*(f) output directing means to direct said first scanning output to said first circuit means and said second scanning output to said second circuit means each respectively; and*

*(g) comparison means receiving said first and second scanning outputs through said first and second circuit means and comparing the first scanning output with the second scanning output to provide an output signal representative of the relative positional difference between said first and second images on said sensing means.*

*54. An image comparator, comprising:*

*(a) light sensing means having a plurality of sensing elements, each providing an electrical signal which varies with the change in the intensity of light impinging upon a light receiving surface thereof;*

*(b) light directing means to direct light from first and second fields of view to said light sensing means;*

*(c) light path change-over means for causing said light sensing means to receive the light from said first and second fields of view selectively through said light directing means;*

*(d) time seriating output means for causing said light sensing means to provide as outputs thereof the time seriated electrical signals of the respective sensing elements;*

*said light sensing means selectively providing a first time seriated electrical output related to said first field of view and a second time seriated electrical output related to said second field of view through the change-over operation of said light path change-over means and the time seriating operation of said time seriating output means;*

*(e) processing circuit means receiving said first and second time seriated electrical outputs of said light sensing means and providing a resultant signal which has a charcteristic when the lights from the first and second fields of view attain a predetermined relationship on said light sensing means; and*

*(f) means connected to receive said resultant signal and operable to change at least one of the fields of view until the resultant signal is proximate the characteristic.*

*55. The improvement as in claim 48, wherein said time seriating output means is means for providing said sensing means with time seriating timing signals to cause the sensing means to provide as the outputs thereof the time seriated electrical signals of the respective sensing elements;*

*said sensing means provides time seriated electrical signals on the radiation energy intensity distributions of said two images in response to said time seriating timing signals provided by said time seriating output means.*

*56. The improvement as in claim 48, wherein said sensing means includes a plurality of addressable sensing elements, and said time seriating output means is address means for addressing, in time-seriated manner, the respective sensing elements in the sensing means to cause the sensing means to provide as the outputs thereof the time seriated electrical signals of the respective sensing elements.*

*57. The improvement as in claim 48, wherein said time seriating output means is pulse controlled means which is operable, in response to supplied control pulses, to feed the electrical signal of each of the sensing elements in said sensing means to said circuit means in a time-seriated manner.*

*58. A system, comprising:*

*image forming means for receiving energy from a source along two paths and forming two images of the source;*

*a receiving arrangement having a plurality of sensing elements, said elements being arranged to receive energy of a plurality of portions of one of the images and of a plurality of portions of the other of the images and to produce two sets of electrical signals, each signal being in response to a characteristic of the energy at an element;*

*scanning means coupled to the receiving arrangement for sequentially sampling the signals in each of the two sets to produce a time-seriating output for each set; and*

*comparing means for comparing the two outputs to produce indications indicative of the relative positional difference between the two images on the receiving arrangement.*

*59. A system as in claim 58, wherein said image forming means includes:*

*a first image forming device for forming the first image of the source,*

*a second image forming device spaced from the first image forming device for forming the second image.*

*60. A system as in claim 58, wherein said image forming means, said receiving arrangement, and said scanning means form a detector, said system further comprising:*

*feedback means coupling said comparing means to said detector for varying one of the sets of said time-seriating outputs.*

*61. A system as in claim 59, wherein said image forming means, said receiving arrangement, and said scanning means form a detector, said system further comprising:*

*feedback means coupling said comparing means to said detector for varying one of the sets of said time-seriating outputs.*

*62. A system as in claim 58, further comprising:*

*feedback means coupled to the comparing means and said image forming means for varying one of the sets of the time-seriating outputs.*

*63. A system as in claim 59, further comprising:*

*feedback means coupled to the comparing means and one of the image forming devices for changing the relative positions of the image forming devices to vary one of the sets of the time-seriating outputs.*

*64. A system as in claim 60, further comprising:*

*a body defining a focusing plane, and*

*an objective device for focusing an image of the source onto the focusing plane,*

*said feedback means being connected to said objective device for moving the objective device toward a focused position in response to indications provided by said comparing means.*

*65. A system as in claim 62, further comprising:*

*a body defining a focusing plane, and*

*an objective device for focusing an image of the source onto the focusing plane,*

*said feedback means being connected to said objective device for moving the objective device toward a focused position in response to indications provided by said comparing means.*

*66. A system as in claim 58, wherein:*

*said elements are arranged in two arrays, each in the path of one of the images, and*

*wherein said scanning means separately scans each of the two arrays.*

*67. A system as in claim 59, wherein said elements are arranged in two arrays, each in the path of one of the images, and*

*wherein said scanning means separately scans each of the two arrays.*

*68. A system as in claim 60, wherein said elements are arranged in two arrays, each in the path of one of the images, and wherein said scanning means separately scans each of the two arrays.*

*69. A system as in claim 61, wherein said elements are arranged in two arrays, each in the path of one of the images, and*

*wherein said scanning means separately scans each of the two arrays.*

*70. A system as in claim 62, wherein said elements are arranged in two arrays, each in the path of one of the images, and*

*wherein said scanning means separately scans each of the two arrays.*

*71. A system as in claim 63, wherein said elements are arranged in two arrays, each in the path of one of the images, and*

*wherein said scanning means separately scans each of the two arrays.*

*72. A system as in claim 64, wherein said elements are arranged in two arrays, each in the path of one of the images, and*

*wherein said scanning means separately scans each of the two arrays.*

*73. A system as in claim 65, wherein said elements are arranged in two arrays, each in the path of one of the images, and*

*wherein said scanning means separately scans each of the two arrays.*

*74. A system as in claim 58, wherein:*

*said elements are arranged in an array, and*

*said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*75. A system as in claim 59, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*76. A system as in claim 60, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*77. A system as in claim 61, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*78. A system as in claim 62, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*79. A system as in claim 63, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*80. A system as in claim 64, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

*81. A system as in claim 64, wherein:*

*said elements are arranged in an array, and said arrangement includes alternating means for alternately applying the energy of each of the images onto the array, and said scanning means first scans the array when it receives one image, and then scans the array when it receives the other image,*

*said comparing means includes means for comparing the alternating scans with each other.*

* * * * *